US012602231B2

(12) United States Patent
Yu

(10) Patent No.: US 12,602,231 B2
(45) Date of Patent: Apr. 14, 2026

(54) PROCESSOR, PHYSICAL REGISTER MANAGEMENT METHOD, AND ELECTRONIC APPARATUS

(71) Applicant: Hygon Information Technology Co., Ltd., Tianjin (CN)

(72) Inventor: Yaxuan Yu, Tianjin (CN)

(73) Assignee: Hygon Information Technology Co., Ltd., Tianjin (CN)

( * ) Notice: Subject to any disclaimer, the term of this patent is extended or adjusted under 35 U.S.C. 154(b) by 282 days.

(21) Appl. No.: 18/574,134

(22) PCT Filed: May 17, 2022

(86) PCT No.: PCT/CN2022/093256
§ 371 (c)(1),
(2) Date: Dec. 26, 2023

(87) PCT Pub. No.: WO2023/029591
PCT Pub. Date: Mar. 9, 2023

(65) Prior Publication Data
US 2024/0354112 A1     Oct. 24, 2024

(30) Foreign Application Priority Data

Sep. 3, 2021     (CN) .......................... 202111031336.0

(51) Int. Cl.
G06F 9/38         (2018.01)
G06F 9/30         (2018.01)
G06F 9/54         (2006.01)

(52) U.S. Cl.
CPC ........ G06F 9/3851 (2013.01); G06F 9/30138 (2013.01); G06F 9/542 (2013.01)

(58) Field of Classification Search
CPC ..... G06F 9/30138; G06F 9/542; G06F 9/3851
See application file for complete search history.

(56) References Cited

U.S. PATENT DOCUMENTS 5,784,615 A * 7/1998 Lipe ...................... G06F 9/4484
                                                              712/E9.082
9,817,664 B2 * 11/2017 Ron .................... G06F 9/30123
(Continued)

FOREIGN PATENT DOCUMENTS

| CN | 107851006 A | 3/2018 |
| CN | 113626205 A | 11/2021 |
| WO | 2020213397 A1 | 10/2020 |

OTHER PUBLICATIONS

Extended European Search Report dated Oct. 8, 2024 for European patent application No. 22862733.7, 4 pages.
(Continued)

*Primary Examiner* — Zachary K Huson
(74) *Attorney, Agent, or Firm* — Fox Rothschild LLP

(57) ABSTRACT

A processor, a physical register management method, and an electronic apparatus. The processor includes: a plurality of physical registers, which are configured to be multiplexed by a plurality of threads executed on the processor, and a thread information storage apparatus, which is configured to record a correlation between the plurality of physical registers and the plurality of threads. A correlation between a physical register and a thread is recorded by using a thread information storage apparatus, such that when a physical register number is broadcasted in error due to a fault occurring in hardware or for another reason, error correction can be realized in a timely manner, thereby preventing a subsequent series of errors and ensuring the normal operation of a processor.

17 Claims, 2 Drawing Sheets

(56)                    References Cited

U.S. PATENT DOCUMENTS

| | | | |
|---|---|---|---|
| 2008/0313437 | A1 | 12/2008 | Gschwind |
| 2009/0100249 | A1 | 4/2009 | Eichenberger et al. |
| 2012/0216004 | A1 | 8/2012 | Abernathy et al. |
| 2013/0166886 | A1* | 6/2013 | Sasanka ................ G06F 9/3842 |
| | | | 712/216 |
| 2014/0122842 | A1 | 5/2014 | Abernathy et al. |
| 2014/0244977 | A1 | 8/2014 | Garbacea |
| 2018/0210732 | A1* | 7/2018 | Zhu ......................... G06F 15/78 |
| 2021/0049014 | A1* | 2/2021 | Ma ......................... G06F 9/3851 |

OTHER PUBLICATIONS

International Search Report for PCT/CN2022/093256 dated Jul. 22, 2022.

\* cited by examiner

Enable physical registers to be multiplexed by different threads in different times on a processor — S300

Record the mapping relation between the physical registers and threads by using a thread information storage apparatus — S310

Electronic device 40

Processor 41

PROCESSOR, PHYSICAL REGISTER MANAGEMENT METHOD, AND ELECTRONIC APPARATUS

RELATED APPLICATIONS AND CLAIM OF PRIORITY

This application is a national stage filing of and claims priority to International Patent Application No. PCT/CN2022/093256, filed on May 17, 2022, which claims the priority of Chinese Patent Application No. 202111031336.0 filed on Sep. 3, 2021. The full text of the Chinese Patent Application and International Patent Application are incorporated herein by reference as a part of this application.

TECHNICAL FIELD

Embodiments of the present disclosure relate to a processor, a physical register management method, and an electronic apparatus.

BACKGROUND

CPU (Central Processing Unit) multithreading is called SMT (Simultaneous multithreading). Multithreading can make multiple threads on the same processor execute synchronously and share the resources of the processor by copying a structural state on the processor. In order to realize an out-of-order execution of the processor, a physical register is usually renamed to map a logical register in the instruction to the physical register. When the physical registers in the current processor are multiplexed by multiple threads, it is easy to make mistakes. For example, after a thread A releases a physical register prn1, the physical register prn1 is reallocated to a thread B. If the thread A broadcasts a physical register number of the prn1 due to, for example, a hardware error after the thread A releases the physical register prn1, the thread B will think that the data of the physical register prn1 is ready, but in fact the data of the physical register prn1 is not ready at this time, resulting in an error. Faced with this kind of error, the conventional thinking is that a processor hardware recognizes that the thread A has released the physical register prn1 and prevents the thread A from broadcasting its physical register number. However, in practical application or actual circuit design, it is not only difficult to realize the above ideas by using the processor hardware, but also easy to make mistakes. For example, the newly dispatched instruction selects the same physical register at the same time, or an instruction is executed in advance before the producer of the instruction is executed.

SUMMARY

At least one embodiment of the present disclosure provides a processor including a plurality of physical registers and a thread information storage apparatus, the plurality of physical registers are configured to be multiplexed by a plurality of threads executed on the processor; and the thread information storage apparatus is configured to record a corresponding relationship between the plurality of physical registers and the plurality of threads.

For example, in the processor provided by an embodiment of the present disclosure, the corresponding relationship is a corresponding relationship representing whether each of the plurality of physical registers is allocated to one of the plurality of threads currently.

For example, in the processor provided by an embodiment of the present disclosure, the processor further includes a controller, wherein the controller is configured to modify corresponding relationship in the thread information storage apparatus in response to one of the plurality of physical registers being allocated to one of the plurality of threads and/or one of the plurality of physical registers being released.

For example, in the processor provided by an embodiment of the present disclosure, the controller is further configured to, record a first thread number of a first thread among the plurality of threads in an item corresponding to a first selected physical register among the plurality of physical registers in the thread information storage apparatus, in response to the first selected physical register being allocated to the first thread and the first thread setting the first selected physical register to invalid.

For example, in the processor provided by an embodiment of the present disclosure, the controller is further configured to, in response to a broadcasting operation for the first selected physical register, acquire a second thread number of a second thread that initiates the broadcasting operation among the plurality of threads, and acquire the first thread number recorded in the item corresponding to the first selected physical register in the thread information storage apparatus; determine the broadcasting operation as a valid broadcasting operation in response to the second thread number being the same as the first thread number; determine the broadcasting operation as an invalid broadcasting operation in response to the second thread number being different from the first thread number.

For example, in the processor provided by an embodiment of the present disclosure, the controller is further configured to record the invalid broadcasting operation and the second thread number of the second thread that initiates the invalid broadcasting operation.

For example, in the processor provided by an embodiment of the present disclosure, the controller is further configured to prevent the second thread from writing data into the first selected physical register in response to determining that the broadcasting operation is the invalid broadcasting operation and determining the second thread number.

At least one embodiment of the present disclosure provides a physical register management method, which includes: enabling a plurality of physical registers to be multiplexed by a plurality of threads executed on a processor; and recording the corresponding relationship between the plurality of physical registers and the plurality of threads by using a thread information storage apparatus.

For example, in the method provided by an embodiment of the present disclosure, wherein the corresponding relationship is a corresponding relationship representing whether each of the plurality of physical registers is currently assigned to one of the plurality of threads.

For example, the method provided by an embodiment of the present disclosure further includes modifying the corresponding relationship in the thread information storage apparatus in response to one of the plurality of physical registers being allocated to one of the plurality of threads and/or in response to one of the plurality of physical registers being released.

For example, the method provided by an embodiment of the present disclosure further includes: recording a first thread number of a first thread among the plurality of threads in an item corresponding to a first selected physical register among the plurality of physical registers in the thread information storage apparatus, in response to the first selected physical register being allocated to the first thread and the first thread setting the first selected physical register to invalid.

For example, the method provided by an embodiment of the present disclosure further includes: in response to the broadcasting operation for the first selected physical register, acquiring a second thread number of a second thread that initiates the broadcasting operation among the plurality of threads, and acquiring the first thread number recorded in the item corresponding to the first selected physical register in the thread information storage apparatus; determining the broadcasting operation as a valid broadcasting operation in response to the second thread number being the same as the first thread number; and determining the broadcasting operation as an invalid broadcasting operation in response to the second thread number being different from the first thread number.

For example, the method provided by an embodiment of the present disclosure further includes: recording the invalid broadcasting operation and the second thread number of the second thread that initiates the invalid broadcasting operation.

For example, the method provided by an embodiment of the present disclosure further includes: in response to determining that the broadcasting operation is the invalid broadcasting operation and determining the second thread number, preventing the second thread from writing data into the first selected physical register.

At least one embodiment of the present disclosure provides an electronic device including the processor described in any of the above embodiments.

BRIEF DESCRIPTION OF THE DRAWINGS

In order to more clearly explain the technical scheme of the embodiments of the present disclosure, the following drawings will be briefly introduced. Obviously, the drawings described below only relate to some embodiments of the present disclosure, and are not limited to the present disclosure.

DETAILED DESCRIPTION

Figure 1:
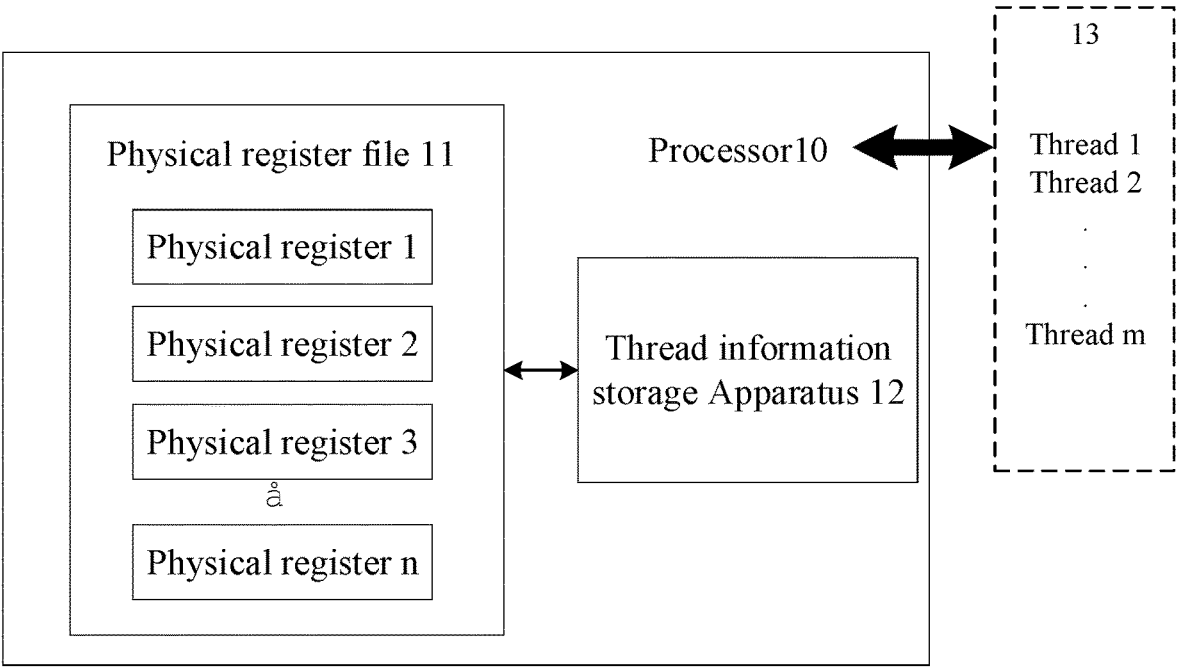
FIG. 1 is a block diagram of a processor provided by at least one embodiment of the present disclosure.

In order to make the purpose, technical scheme and advantages of the embodiment of the disclosure more clear, the technical scheme of the embodiment of the present disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in the present disclosure shall have their ordinary meanings as understood by people with ordinary skills in the field to which the present disclosure belongs. The terms "first", "second" and the like used in the present disclosure do not indicate any order, quantity or importance, but are only used to distinguish different components. Similarly, similar words such as "a", "an" or "the" do not indicate a quantity limit, but indicate the existence of at least one. Similar words such as "comprising" or "including" mean that the elements or objects appearing before the word cover the elements or objects listed after the word and their equivalents, without excluding other elements or objects. Similar words such as "connect" or "connected" are not limited to physical or mechanical connection, but can comprise electrical connection, whether direct or indirect. "Up", "Down", "Left" and "Right" are only used to indicate the relative positional relationship. When the absolute position of the described object changes, the relative positional relationship may also change accordingly.

At least one embodiment of that present disclosure provides a processor including a plurality of physical registers and a thread information storage apparatus, the plurality of physical registers are configured to be multiplexed by a plurality of threads executed on the processor; and the thread information storage apparatus is configured to record a corresponding relationship between the plurality of physical registers and the plurality of threads.

At least one embodiment of that present disclosure provides a physical register management method, which includes: enabling a plurality of physical registers to be multiplexed by a plurality of threads executed on a processor; and recording the corresponding relationship between the plurality of physical registers and the plurality of threads by using a thread information storage apparatus.

At least one embodiment of the present disclosure provides an electronic device including the processor described in any of the above embodiments.

Embodiments of the present disclosure provide the processor, the physical register management method and the electronic device. By using the thread information storage apparatus to record the corresponding relationship between the physical register and the thread, when a physical register number is erroneously broadcast due to a hardware failure or other reasons, an error correction can be realized in time, thereby avoiding subsequent series of errors and ensuring a normal operation of the processor.

Some concepts involved in the present disclosure are briefly described below.

The broadcast of the physical register number indicates that a producer's data has been generated, and a consumer can use the data and start a scheduling execution. For example, when the broadcast of a physical register number 80 (i.e., physical register number=80) is valid, it means that the data in the physical register with the physical register number 80 is available, for example, it can be read.

The producer is the instruction that generates data, and the consumer is the instruction that uses data generated by the producer.

The physical register allocation refers to a process of mapping a destination logical register number to a destination physical register number.

A physical register release refers to releasing the physical register number after an instruction is executed and submitted. For example, when an instruction is flushed, a newly allocated physical register number will be released, so that the physical register corresponding to the physical register number can be allocated again.

The Flush refers to an operation of canceling the execution of the current instruction and deleting a current instruction from an instruction queue.

Embodiments of the present disclosure will be described below with reference to the accompanying drawings.

FIG. 1 shows a block diagram of a processor provided by an embodiment of the present disclosure.

As shown in FIG. 1, the processor 10 includes a physical register file 11 and a thread information storage apparatus 12. The physical register file 11 is coupled with a thread information storage apparatus 12. The physical register file 11 is configured to be multiplexed by multiple threads 13 executed on the processor 10.

The physical register file 11 includes n physical registers, namely physical register 1 to physical register n. For example, there are two or more threads (thread 1, thread 2, . . . , thread M) executed on the processor 10, and the physical register file 11 includes 100 physical registers, then one or more of these 100 physical registers can be multiplexed by these two or more threads, for example, in time division. In addition, in this embodiment, the amount of the physical registers and the amount of the threads can be any values. The thread information storage apparatus 12 is configured to record a corresponding relationship between the physical register file 11 and multiple threads 13. For example, the thread information storage apparatus 12 may be a storage device such as a register, a memory, a flash memory, etc. For example, if the thread information storage apparatus 12 is a 100-bit register, it can record a corresponding relationship that indicate to which threads the 100 physical registers are assigned. By adding the thread information storage apparatus in the processor, the processor can use information recorded by the thread information storage apparatus to realize error correction.

Optionally, the corresponding relationship is a corresponding relationship that characterizes whether each physical register in the current plurality of physical registers is assigned to one of the plurality of threads.

In the following, the physical register file 11 includes 100 physical registers as an example. For example, a thread number and a physical register number are used to represent the corresponding relationship, and it is assumed that ClearTid[n] is used to represent the thread number corresponding to the physical register, where n is an integer with values from 0 to 99, and ClearTid[n]=0, 1, . . . , m, wherein ClearTid[n]=0 represents the n+1 physical register (also known as physical register n+1, and other situations are similar) is thread 0. ClearTid[n]=1 means that the thread corresponding to the physical register n+1 is thread 1, and cleartid [n]=m means that the thread corresponding to the physical register n+1 is thread m (m is an integer whose value is determined according to the number of threads currently executed). ClearTid[n]=0/1 can also be interpreted as which of the threads 0, 1, . . . , m sets the physical register n invalid.

It should be noted that "invalid" in the present disclosure is intended to represent an allocated relationship between the physical registers and the threads, and should not be understood as a problem with the physical registers.

Figure 2:
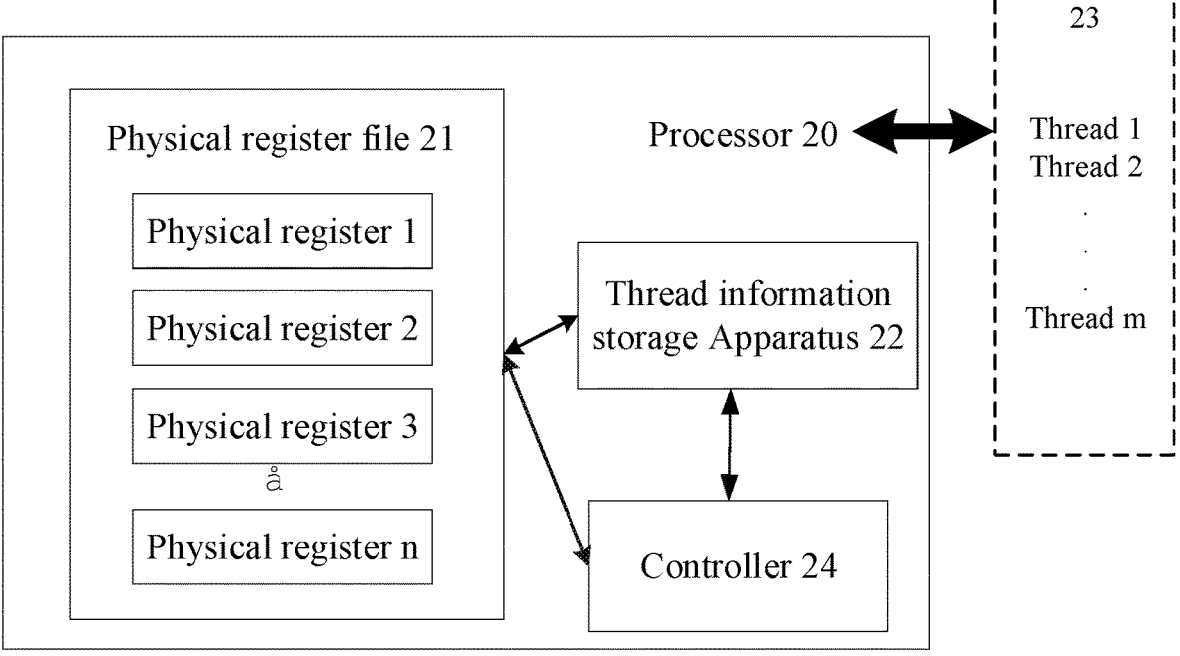
FIG. 2 is a block diagram of a processor provided by at least one embodiment of the present disclosure.

FIG. 2 shows a block diagram of yet another processor of an embodiment of the present disclosure.

As shown in FIG. 2, a processor 20 includes a physical register file 21 and a thread information storage apparatus 22. Similar to the processor 10 shown in FIG. 1, the physical register file 21 is configured to be multiplexed by multiple threads 23 (thread 1, thread 2, . . . and thread m) executed on the processor 20, and the thread information storage apparatus 22 is configured to record the corresponding relationship between the physical register file 21 and the multiple threads 23.

In addition, the processor 20 also includes a controller 24. The controller 24 is configured to modify a corresponding relationship in the thread information storage apparatus 22 in response to one physical register in the physical register file 21 being allocated to one of the multiple threads 23 and/or in response to one physical register in the physical register file 21 being released. The physical register file 21 is coupled with the thread information storage apparatus 22, and the controller 24 is coupled with the thread information storage apparatus 22 and the physical register file 21.

By adding the controller, the corresponding relationship between the threads and the physical registers can be recorded more efficiently, thus reducing the errors caused by the untimely update of the corresponding relationship.

For example, if a 24th physical register in the physical register file 21 is allocated to a 10th thread (also called thread 10, otherwise similar), the controller 24 modifies the corresponding relationship between the 24th physical register and the 10th thread in the thread information storage apparatus 22 to indicate that the 24th physical register is currently allocated to the 10th thread. Optionally, after the 10th thread releases the 24th physical register, the controller 24 will also modify the corresponding relationship between the 24th physical register and the 10th thread in the thread information storage apparatus 22, so as to indicate that the 24th physical register can be allocated to any one of the multiple threads 23 currently.

In some embodiments, the controller 24 is further configured to record the first thread number of the first thread in the thread information storage apparatus 22 in response to the first selected physical register in the physical register file 21 being allocated to the first thread of the multiple threads 23 and the first thread invalidates the first selected physical register. By recording the invalid relationship between threads and physical registers, the processor can detect the occurrence of errors more directly and conveniently, and prevent the occurrence of errors more quickly.

Here, the "first thread" refers to the target thread among the multiple threads 23 involved in the current operation, and is not limited to a specific thread; The "first selected physical register" refers to an object physical register among a plurality of physical registers involved in the current operation, and is not limited to a specific physical register. The meanings of "second thread" and "second selected physical register" mentioned below are similar to this and are not limited to a specific thread or physical register.

For example, a physical register 0 in the physical register file 21 is allocated to a thread 9 among the multiple threads 23, the physical register 0 is the first selected physical register, the thread 9 is the first thread, and the thread 9 sets the physical register 0 invalid, then the entry corresponding to the physical register 0 is recorded as the thread number (i.e., 9) of the thread 9 in the thread information storage apparatus 22. For example, ClearTid[0]=9 will be recorded.

After the physical register is allocated to the thread, the thread will set the physical register number as invalid and broadcast it. However, if a hardware error or other event occurs at this time, a thread may broadcast the physical register number of the physical register that is not currently allocated to the thread, which may lead to conflicts in subsequent operations.

In some embodiments, the controller 24 is further configured to, in response to the broadcasting operation for the first selected physical register, acquire the second thread number of the second thread that initiates the broadcasting operation among the multiple threads 23, and acquire the first thread number recorded in the entry corresponding to the first selected physical register in the thread information storage apparatus 22; determine a broadcasting operation as a valid broadcasting operation in response to the second thread number being the same as the first thread number; in response to the second thread number being different from the first thread number, the broadcasting operation is determined as an invalid broadcasting operation. Therefore, the processor 20 can determine the validity of the broadcasting operation, which is convenient for the processor 20 to carry out subsequent operations according to the validity.

For example, the first selected physical register is a physical register 1, which is currently allocated to a thread 3, that is, the thread 3 is the first thread. At this time, the physical register 1 is broadcast, and the controller 24 acquires that the thread broadcasting the physical register number is the thread 2, that is, the thread 2 is the second thread. When the controller 24 acquires from the thread information storage apparatus 22 that the thread number recorded in the entry corresponding to the physical register 1 is 3, the controller 24 determines the broadcasting operation as an invalid broadcasting operation. If the controller 24 acquires that the thread broadcasting the physical register number is the thread 3 (that is, the second thread is the thread 3), the broadcasting operation is determined as a valid broadcasting operation.

In some embodiments, the controller 24 is also configured to record an invalid broadcasting operation and the second thread number of the second thread that initiates the invalid broadcasting operation. Therefore, the processor 20 does not need to deal with the invalid broadcasting operation immediately, but can deal with the error at any time before the error of the subsequent operation according to the recorded information, further improving the fault-tolerant performance.

For example, the controller 24 determines that the broadcasting operation of the physical register number 80 currently broadcast by the thread 4 is an invalid broadcast, then the controller 24 records the broadcasting operation as an invalid broadcast and records that the number of the second thread that initiates the broadcasting operation is 4.

In some embodiments, the controller 24 is further configured to prevent the second thread from writing data to the first selected physical register in response to determining that the broadcasting operation is an invalid broadcasting operation and determining the second thread number.

For example, continuing the precedent, the controller 24 immediately prevents the thread 4 from writing data into the physical register 80 after determining that the broadcasting operation of the physical register 80 broadcast by the thread 4 is an invalid broadcast. For another example, the controller 24 already knows that the broadcasting operation of the physical register number 80 broadcast by the thread 4 is an invalid broadcast, but the controller 24 will prevent the thread 4 from writing data before it writes data to the physical register 80, instead of immediately preventing it from writing data. Another example is that the controller 24 itself prevents the thread 4 from writing data into the physical register 80, or the controller 24 operates the physical register file 21 to prevent the thread 4 from writing data into the physical register 80. It should be noted that in this embodiment, the controller 24 can also prevent the second thread from performing other operations on the first selected physical register, such as data reading.

Figure 3:
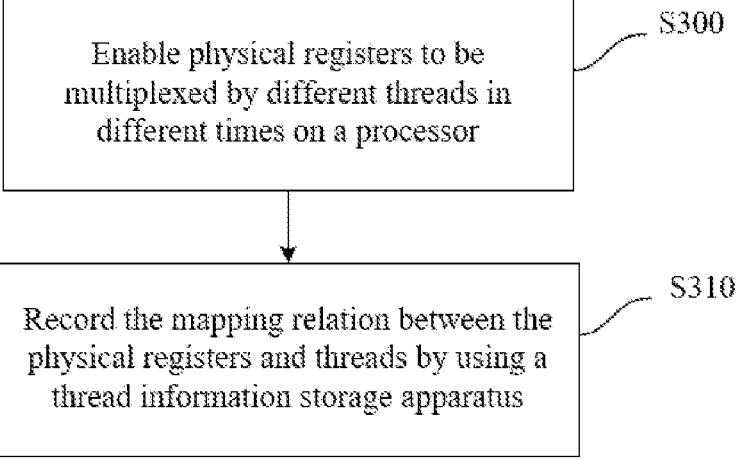
FIG. 3 is a flowchart of a physical register management method provided by at least one embodiment of the present disclosure.

FIG. 3 is a flowchart of a physical register management method provided by an embodiment of the present disclosure.

In FIG. 3, the physical register management method includes:

Step S300, enabling physical registers to be multiplexed by different threads in different times on a processor.

Step S310, recording the mapping relation between the physical registers and the threads by using a thread information storage apparatus.

The physical register management method in this embodiment can be executed by the processor 10 or the processor 20 in the above embodiments.

Optionally, the corresponding relationship is a corresponding relationship representing whether each of the plurality of physical registers is currently assigned to one of the plurality of threads.

In some embodiments, the method further includes modifying the corresponding relationship in the thread information storage apparatus in response to one of the plurality of physical registers being allocated to one of the plurality of threads and/or in response to one of the plurality of physical registers being released.

In some embodiments, the method further includes: recording a thread number of a first thread among the plurality of threads in an item corresponding to a first selected physical register among the plurality of physical registers in the thread information storage apparatus, in response to the first selected physical register being allocated to the first thread and the first thread setting the first selected physical register to invalid.

In some embodiments, the method further includes: in response to the broadcasting operation for the first selected physical register, acquiring a second thread number of a thread that initiates the broadcasting operation among the plurality of threads, and acquiring a first thread number recorded in an item corresponding to the first selected physical register in the thread information storage apparatus; determining the broadcasting operation as a valid broadcasting operation in response to the second thread number being the same as the first thread number; and determining the broadcasting operation as an invalid broadcasting operation in response to the second thread number being different from the first thread number.

In some embodiments, the method further includes recording the invalid broadcasting operation and the second thread number of the second thread that initiates the invalid broadcasting operation.

In some embodiments, the method further includes: in response to determining that the broadcasting operation is the invalid broadcasting operation and determining the second thread number, preventing the second thread from writing data into the first selected physical register.

The following describes the application process of the processor 20 to execute the above-mentioned physical register management method in three exemplary error scenarios.

The following three error scenarios are all described by taking the thread 0, the thread 1 and the physical register number 80 as examples, but these error scenarios can appear in the case of more threads and multiple physical registers. In the following error scenario, times T0 to Tn are only used to distinguish a plurality of different times, and the number of times and the length of time between times are not limited.

TABLE 1

| | | | | | |
|---|---|---|---|---|---|
| | | | Error Scenario 1 | | |
| Time | T0 | T1 | T2 | | . . . Tn |
| Thread 0 | Release the physical register 80 | | Broadcast release physical register number 80 | | |
| Thread 1 | The physical register 80 is allocated for thread 1 | The physical register number 80 is set to invalid. ClearTid[80] = 1 | Receiving the broadcast of the physical register number 80, comparing ClearTid[80] with the broadcast thread number, finding ClearTid[80] = 1, and the current broadcast thread number = 0, determining that is an invalid broadcast, and the physical register number 80 is still unavailable. | | |

As shown in Table 1, in error scenario 1, the invalid broadcast (also called error broadcast) appears before an effective broadcast (also called a normal broadcast). At the time T0, the thread 0 releases the physical register 80, which may be caused by executing the instruction or Flush. As well as, at time T0, the physical register 80 is allocated to thread 1. The allocation of an idle physical registers to the threads can refer to the existing methods and is not limited in the present disclosure.

At the time T2, due to, for example, a hardware error of the processor, the thread 0 broadcasts the physical register number 80, which will be sent to all instructions to be scheduled. After the thread 1 receives the broadcast, the thread 1 will think that the data in physical register 80 is available, but in fact, the data in physical register 80 is not ready at this time, which will lead to the execution error of the program when the thread 1 reads the data in the physical register 80.

In order to cope with the error scenario 1, the processor 20 sets the physical register number 80 as invalid at the time T1, and records in the thread information storage apparatus 22 that the value of the entry corresponding to the physical register 80 is 1, that is, ClearTid[80]=1, which means that the thread 1 sets the physical register 80 as invalid.

At the time T2, the controller 24 receives the broadcast of the physical register number 80 from the thread 0, accesses the thread information storage apparatus 22, and acquires that the thread with the physical register 80 set invalid is the thread 1. Since the thread 1 has not broadcast at this time, even if the thread 0 subsequently writes data to the physical register 80, it will be overwritten by the data written by the following the thread 1, so it can still be considered that the physical register is unavailable at this time, and there is no need to prevent the thread 0 from writing data to the physical register 80.

TABLE 2

| | | | | | | |
|---|---|---|---|---|---|---|
| | | | | Error Scenario 2 | | |
| Time | T0 | T1 | T2 | T3 | T4   T5 | T6 |
| Thread 0 | Release the physical register 80 | | | Broadcast release physical register number 80 | | Prevent the thread 0 from writing to the physical register 80 |
| | | | | The thread number of current broadcast = 0, ClearTid[80] = 1, these two values are not equal, which determines that the thread 0 is an invalid broadcast | | |
| Thread 1 | The physical register 80 is allocated for thread 1 | The physical register number 80 is set to invalid. ClearTid[80] = 1 | Broadcast release physical register number 80 | | | Write data into the physical register 80 |

As shown in Table 2, in the error scenario 2, the invalid broadcast appears before the valid broadcast. At the time T0, the thread 0 releases the physical register 80, and at the time T0, the physical register 80 is allocated to the thread 1.

At the time T2, the thread 1 broadcasts the physical register number 80 to indicate that the physical register 80 is available. At the time T3, due to an error, the thread 0 also broadcasts the physical register number 80. Unlike the error scenario 1, an invalid broadcast occurs after a valid broadcast. At the time T5, the thread 1 correctly writes data into the physical register 80. At the time T6, due to the invalid broadcast of the thread 0, the thread 0 also writes data into the physical register 80 and this data overwrites the data written by the thread 1, resulting in that the thread 1 gets wrong data when it wants to use the data in the physical register 80.

In order to cope with the error scenario 2, the processor 20 sets the physical register number 80 as invalid at the time T1, and records in the thread information storage apparatus 22 that the value of the entry corresponding to the physical register 80 is 1, that is, ClearTid[80]=1, which means that the thread 1 sets the physical register 80 as invalid.

At the time T3, the controller 24 receives the broadcast of the physical register number 80 from the thread 0, accesses the thread information storage apparatus 22, and acquires the thread that invalidated the physical register 80 as the thread 1. Based on these two pieces of information, the controller 24 determines that the broadcast at the time T3 is an invalid broadcast. At following the time T6, the controller 24 prevents the thread 0 from writing data into the physical register 80 in response to determining that the broadcast at the time T3 is an invalid broadcast.

Optionally, after the time T3, the controller 24 also records that the broadcast at the time T3 is invalid and records the thread 0 that initiates the invalid broadcast. Therefore, at the time T5, the controller 24 prevents the thread 0 from writing into the physical register 80 according to the recorded information.

TABLE 3

| Error Scenario 3 | | | | |
|---|---|---|---|---|
| Time | T0 | T1 | T2 | . . . T5 |
| Thread 0 | Release the physical register 80 | | Broadcast release physical register number 80 | Prevent the thread 0 from writing to the physical register 80 |
| | | | The thread number of current broadcast = 0, ClearTid[80] = 1, these two values are not equal, which determines that the thread 0 is an invalid broadcast | |
| Thread 1 | The physical register 80 is allocated for thread 1 | The physical register number 80 is set to invalid. ClearTid[80] = 1 | Broadcast release physical register number 80 | Write data into the physical register 80 |

As shown in the Table 3, in the error scenario 3, the invalid broadcast appears before the valid broadcast. At the time T0, the thread 0 releases the physical register 80, and at the time T0, the physical register 80 is allocated to the thread 1.

Similar to the error scenario 2, the difference is that at the time T2, the thread 1 broadcasts the physical register number 80 to indicate that the physical register 80 is available. Due to the error, the thread 0 also broadcasts the physical register number 80 at the time T2. Therefore, at the time T5, both the thread 1 and the thread 0 want to write data into the physical register 80, resulting in writing data conflict.

In order to cope with the error scenario 3, the processor 20 sets the physical register number 80 as invalid at the time T1, and records in the thread information storage apparatus 22 that the value of the item corresponding to the physical register 80 is 1, that is, ClearTid[80]=1, which means that the thread 1 sets the physical register 80 as invalid.

At the time T2, the controller 24 receives the broadcast of the physical register number 80 from both the thread 0 and the thread 1, accesses the thread information storage apparatus 22, and acquires that the thread that sets the physical register 80 invalid is the thread 1. Based on these two pieces of information, the controller 24 determines that the broadcast of the thread 0 is an invalid broadcast. At the subsequent the time T5, the controller 24 prevents the thread 0 from writing data into the physical register 80 in response to determining that the broadcast of the thread 0 is an invalid broadcast.

Optionally, the controller 24 also records the broadcast of the thread 0 as invalid broadcast and records the thread 0 that initiates the invalid broadcast after time T2. Therefore, at the time T5, the controller 24 prevents the thread 0 from writing into the physical register 80 according to the recorded information.

Figure 4:
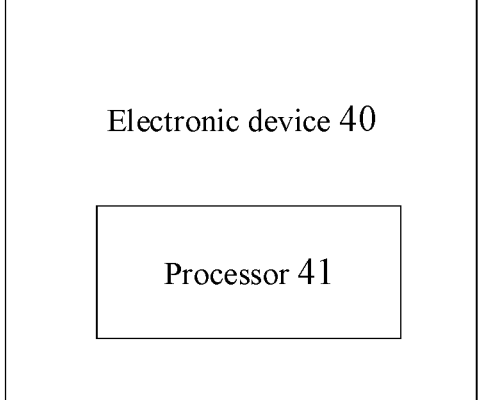
FIG. 4 is a block diagram of an electronic device provided by at least one embodiment of the present disclosure.

FIG. 4 shows a block diagram of an electronic device provided by an embodiment of the present disclosure.

In FIG. 4, an electronic device 40 includes a processor 41. The processor 41 may be the processor 10 shown in FIG. 1 or the processor 20 shown in FIG. 2. In addition to the processor 41, the electronic device 40 may also include, for example, a storage apparatus, an input/output apparatus, a communication apparatus, etc. as required, which is not limited by the embodiment of the present disclosure.

The electronic device 40 can be realized as a cellular phone, a smart phone, a desktop computer, a laptop computer, a personal digital assistant (PDA), a satellite radio, a global positioning system, a multimedia device, a video device, a digital audio player (for example, an MP3 player), a video camera, a game console, a tablet computer, a smart device, a wearable device, a vehicle, an electric meter, an air pump, large or small kitchen appliances, medical care, an implant, a sensor/actuator, a display or any other device with the processor.

The following points need to be explained:

(1) The drawings of the embodiments of the present disclosure only relate to the structures involved in the embodiments of the present disclosure, and other structures can refer to the general design.

(2) In case of no conflict, any embodiment of the present disclosure and the features in the embodiment can be combined with each other to obtain a new embodiment.

The above is only the specific implementation of the present disclosure, but the protection scope of the present disclosure is not limited to this, and the protection scope of the present disclosure shall be subject to the protection scope of the claims.

What is claimed is:

1. A processor, comprising:
   a plurality of physical registers, configured to be multiplexed by a plurality of threads executed on the processor; and
   a thread information storage apparatus, configured to record a corresponding relationship between the plurality of physical registers and the plurality of threads;
   wherein the processor further comprises a controller, and
   wherein the controller is configured to modify the corresponding relationship in the thread information storage apparatus in response to one of the plurality of physical registers being allocated to one of the plurality of threads and/or one of the plurality of physical registers being released.

2. The processor according to claim 1, wherein the corresponding relationship is a corresponding relationship representing whether each of the plurality of physical registers is allocated to one of the plurality of threads currently.

3. The processor according to claim 1, wherein the controller is further configured to record a first thread number of a first thread among the plurality of threads in an item corresponding to a first selected physical register among the plurality of physical registers in the thread information storage apparatus in response to the first selected physical register being allocated to the first thread and the first thread setting the first selected physical register to invalid.

4. The processor according to claim 3, wherein the controller is further configured to:
   in response to a broadcasting operation for the first selected physical register, acquire a second thread number of a second thread that initiates the broadcasting operation among the plurality of threads, and acquire the first thread number recorded in the item corresponding to the first selected physical register in the thread information storage apparatus;
   determine the broadcasting operation as a valid broadcasting operation in response to the second thread number being identical to the first thread number; and
   determine the broadcasting operation as an invalid broadcasting operation in response to the second thread number being different from the first thread number.

5. The processor according to claim 4, wherein the controller is further configured to record the invalid broadcasting operation and the second thread number of the second thread that initiates the invalid broadcasting operation.

6. The processor according to claim 5, wherein the controller is further configured to prevent the second thread from writing data into the first selected physical register in response to determining that the broadcasting operation is the invalid broadcasting operation.

7. A physical register management method, comprising:
   enabling a plurality of physical registers to be multiplexed by a plurality of threads executed on a processor;
   recording a corresponding relationship between the plurality of physical registers and the plurality of threads by using a thread information storage apparatus; and
   modifying the corresponding relationship in the thread information storage apparatus in response to one of the plurality of physical registers being allocated to one of the plurality of threads and/or one of the plurality of physical registers being released.

8. The method according to claim 7, wherein the corresponding relationship is a corresponding relationship representing whether each of the plurality of physical registers is allocated to one of the plurality of threads currently.

9. The method according to claim 7, further comprising: recording a first thread number of a first thread among the plurality of threads in an item corresponding to a first selected physical register among the plurality of physical registers in the thread information storage apparatus in response to the first selected physical register being allocated to the first thread and the first thread setting the first selected physical register to invalid.

10. The method according to claim 9, further comprising: in response to a broadcasting operation for the first selected physical register, acquiring a second thread number of a second thread that initiates the broadcasting operation among the plurality of threads, and acquiring the first thread number recorded in the item corresponding to the first selected physical register in the thread information storage apparatus;

determining the broadcasting operation as a valid broadcasting operation in response to the second thread number being identical to as the first thread number; and determining the broadcasting operation as an invalid broadcasting operation in response to the second thread number being different from the first thread number.

11. The method according to claim 10, further comprising:

recording the invalid broadcasting operation and the second thread number of the second thread that initiates the invalid broadcasting operation.

12. The method according to claim 11, further comprising:

preventing the second thread from writing data into the first selected physical register in response to determining that the broadcasting operation is the invalid broadcasting operation.

13. An electronic device, comprising a processor, wherein the processor comprises:

a plurality of physical registers, configured to be multiplexed by a plurality of threads executed on the processor; and a thread information storage apparatus, configured to record a corresponding relationship between the plurality of physical registers and the plurality of threads;

wherein the processor further comprises a controller, amd wherein the controller is configured to modify the corresponding relationship in the thread information storage apparatus in response to one of the plurality of physical registers being allocated to one of the plurality of threads and/or one of the plurality of physical registers being released.

14. The electronic device according to claim 13, wherein the corresponding relationship is a corresponding relationship representing whether each of the plurality of physical registers is allocated to one of the plurality of threads currently.

15. The electronic device according to claim 13, wherein the controller is further configured to, record a first thread number of a first thread among the plurality of threads in an item corresponding to a first selected physical register among the plurality of physical registers in the thread information storage apparatus in response to the first selected physical register being allocated to the first thread and the first thread setting the first selected physical register to invalid.

16. The electronic device according to claim 15, wherein the controller is further configured to:

in response to a broadcasting operation for the first selected physical register, acquire a second thread number of a second thread that initiates the broadcasting operation among the plurality of threads, and acquire the first thread number recorded in the item corresponding to the first selected physical register in the thread information storage apparatus;

determine the broadcasting operation as a valid broadcasting operation in response to the second thread number being identical to the first thread number; and determine the broadcasting operation as an invalid broadcasting operation in response to the second thread number being different from the first thread number.

17. The electronic device according to claim 16, wherein the controller is further configured to record the invalid broadcasting operation and the second thread number of the second thread that initiates the invalid broadcasting operation.

* * * * *